United States Patent
Williams (10) Patent No.: US 10,272,804 B2
(45) Date of Patent: Apr. 30, 2019

(54) CHILD SAFETY SEAT

(71) Applicant: Wonderland Switzerland AG, Steinhausen (CH)

(72) Inventor: Bruce Williams, Narvon, PA (US)

(73) Assignee: Wonderland Switzerland AG, Steinhausen (CH)

( * ) Notice: Subject to any disclaimer, the term of this patent is extended or adjusted under 35 U.S.C. 154(b) by 0 days.

(21) Appl. No.: 15/805,436

(22) Filed: Nov. 7, 2017

(65) Prior Publication Data
US 2018/0126877 A1 May 10, 2018

Related U.S. Application Data

(60) Provisional application No. 62/419,179, filed on Nov. 8, 2016, provisional application No. 62/507,498, filed on May 17, 2017.

(51) Int. Cl.
*B60N 2/26* (2006.01)
*B60N 2/28* (2006.01)

(52) U.S. Cl.
CPC ......... *B60N 2/2875* (2013.01); *B60N 2/2821* (2013.01)

(58) Field of Classification Search
CPC ............................ B60N 2/2875; B60N 2/2821
USPC ........................................ 297/250.1–256.16
See application file for complete search history.

(56) References Cited

U.S. PATENT DOCUMENTS

| | | | | |
|---|---|---|---|---|
| 5,836,649 A * | 11/1998 | Bonetti | ................ | B60N 2/2821 297/256.1 |
| 5,971,479 A * | 10/1999 | Jacquemot | ........... | B60N 2/2821 297/250.1 |
| 6,264,278 B1 * | 7/2001 | Weimer | ................... | B60N 2/28 297/256.11 |
| 7,735,921 B2 * | 6/2010 | Hutchinson | .......... | B60N 2/2806 297/256.13 |
| 8,123,295 B2 * | 2/2012 | Hutchinson | .......... | B60N 2/2806 297/256.13 |
| 8,544,941 B2 * | 10/2013 | Coote | ................... | B60N 2/2845 297/250.1 |
| 9,156,379 B2 * | 10/2015 | Williams | ............. | B60N 2/2821 |
| 9,771,007 B2 * | 9/2017 | Shellenberger | ...... | B60N 2/2863 |
| 2016/0114706 A1 * | 4/2016 | Hutchinson | .......... | B60N 2/2821 297/256.13 |

* cited by examiner

*Primary Examiner* — Rodney B White
(74) *Attorney, Agent, or Firm* — Baker & McKenzie LLP (57) ABSTRACT

A child safety seat includes a seat shell for receiving a child and having a backrest and a front end opposite to the backrest, an extension member connected with the seat shell, and a latching mechanism. The extension member is positionable in a first configuration where the extension member rises upward at the front end of the seat shell, and in a second configuration where the extension member stretches forward and downward from the front end of the seat shell. The latching mechanism is operable to lock the extension member with respect to the seat shell in any of the first and second configurations.

21 Claims, 9 Drawing Sheets

FIG. 9

CHILD SAFETY SEAT

CROSS-REFERENCE TO RELATED APPLICATIONS

This application respectively claims priority to U.S. Provisional Patent Application No. 62/419,179 filed on Nov. 8, 2016, and to U.S. Provisional Patent Application No. 62/507,498 filed on May 17, 2017, the disclosures of which are entirely incorporated herein by reference.

BACKGROUND

1. Field of the Invention

The present invention relates to child safety seats.

2. Description of the Related Art

A child safety seat is typically used in an automobile vehicle to properly restrain a child in the event of accidental collision. It is widely known that a child safety seat that is placed in a rear facing position can provide better protection, because it can distribute crash forces over a larger portion of the body (i.e., the back supporting the head). The crash protection in the rear facing position may also be improved by providing an anti-rebound bar at a front end of the child safety seat.

However, when the child safety seat is installed on a vehicle seat in a forward facing position, the anti-rebound bar usually has to be removed or stowed for the child to safely ride in the child safety seat. As a result, the conventional anti-rebound bar has a functional use that is limited to only the rear facing position.

Therefore, there is a need for an improved child safety seat having an anti-rebound feature that is more flexible in use, and can address at least the foregoing issues.

SUMMARY

The present application describes a child safety seat having an extension member disposed at a front of the child safety seat that can be adjusted to different configurations of use in accordance with the needs. In one embodiment, the child safety seat includes a seat shell for receiving a child and having a backrest and a front end opposite to the backrest, an extension member connected with the seat shell, and a latching mechanism. The extension member is positionable in a first configuration where the extension member rises upward at the front end of the seat shell, and in a second configuration where the extension member stretches forward and downward from the front end of the seat shell. The latching mechanism is operable to lock the extension member with respect to the seat shell in any of the first and second configurations.

According to another embodiment, a child safety seat described herein includes a seat shell for receiving a child and having a backrest and a front end opposite to the backrest, an extension member, a first and a second latch and a release actuator. The extension member is disposed adjacent to the front end of the seat shell, and includes a first and a second adjustable part. The first adjustable part is slidably connected with the seat shell, the second adjustable part is pivotally connected with the first adjustable part about a pivot joint, the first adjustable part being slidable relative to the seat shell to increase or reduce a distance between the pivot joint and the front end of the seat shell, and the second adjustable part being rotatable relative to the first adjustable part and the seat shell in front of the front end. The first and second latches are respectively assembled with the extension member, the first latch being movable to lock and unlock the first adjustable part with respect to the seat shell, and the second latch being operable to rotationally lock and unlock the second adjustable part with respect to the first adjustable part. The release actuator is assembled with the extension member and is operatively connected with the first and second latches, the release actuator being operable to cause the first and second latches to move concurrently for unlocking the first and second adjustable parts.

DETAILED DESCRIPTION OF THE EMBODIMENTS

Figure 1:
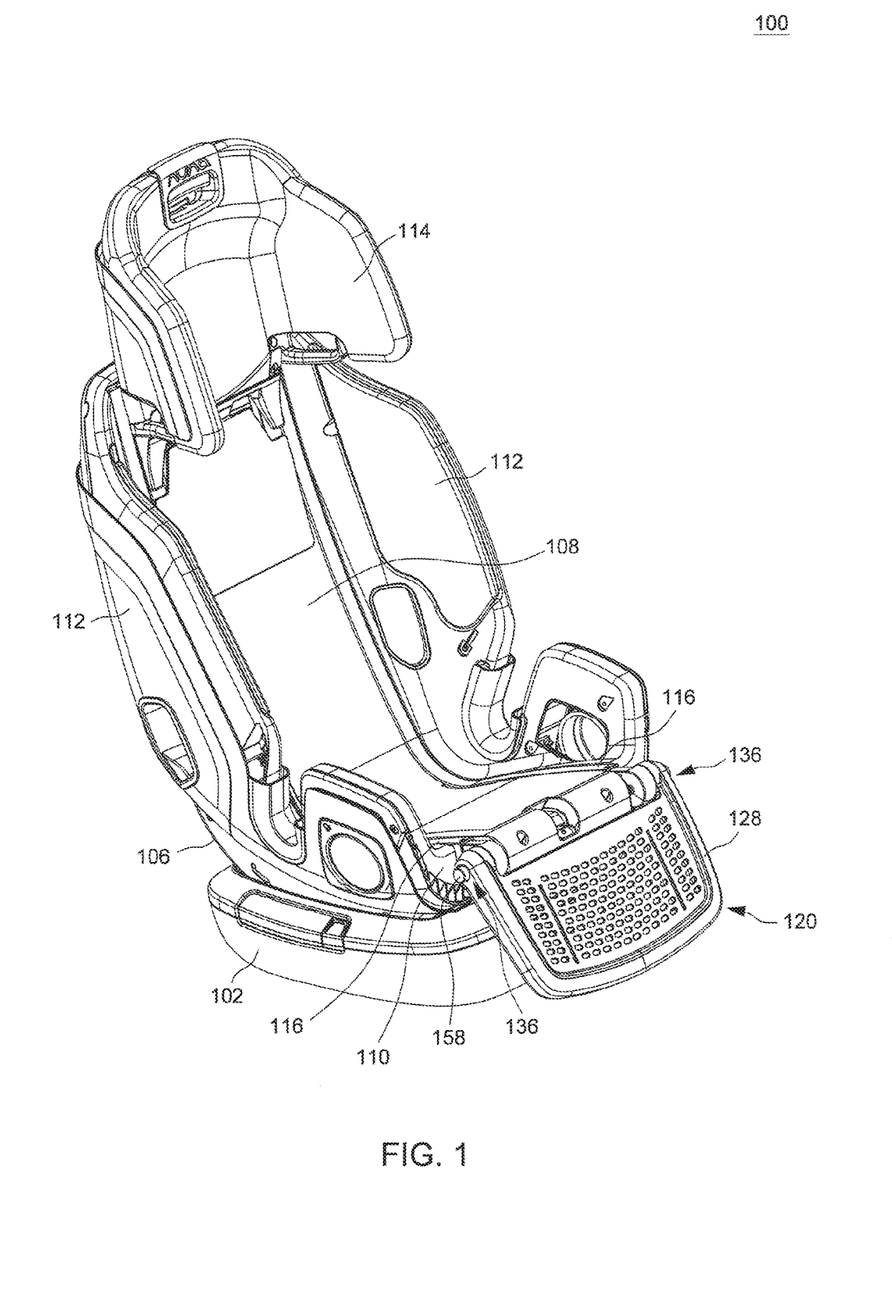
FIG. 1 is a perspective view illustrating an embodiment of a child safety seat.

FIG. 1 is a perspective view illustrating an embodiment of a child safety seat 100 suitable for seating a child in a vehicle. The child safety seat 100 can include a base 102, and a seat shell 106 disposed on the base 102. The base 102 can provide stable support for the seat shell 106, and also allow recline adjustment of the seat shell 106 relative to the base 102. The seat shell 106 can be sized to receive a child. The seat shell 106 has a backrest 108, a front end 110 opposite to the backrest 108, and two lateral guard portions 112 respectively extending along a left and a right side of the seat shell 106 from the backrest 108 to the front end 110. The two lateral guard portions 112 can restrict lateral movement of a child received in the seat shell 106. In addition, the seat shell 106 may be assembled with an adjustable headrest 114. The headrest 114 can slide on the backrest 108 for adjustment according to the size of a child received in the child safety seat 100. Moreover, the seat shell 106 may be fixedly connected with two rigid beams 116 disposed respectively adjacent to the two lateral guard portions 112. The two rigid beams 116 may be provided as a reinforcing structure, and can extend from the backrest 108 to the front end 110 of the seat shell 106. The child safety seat 100 described herein can be installed on a vehicle seat in a rearward facing position (i.e., facing a seatback of a vehicle seat) or a forward facing position (i.e., facing a front of the vehicle).

Figure 2:
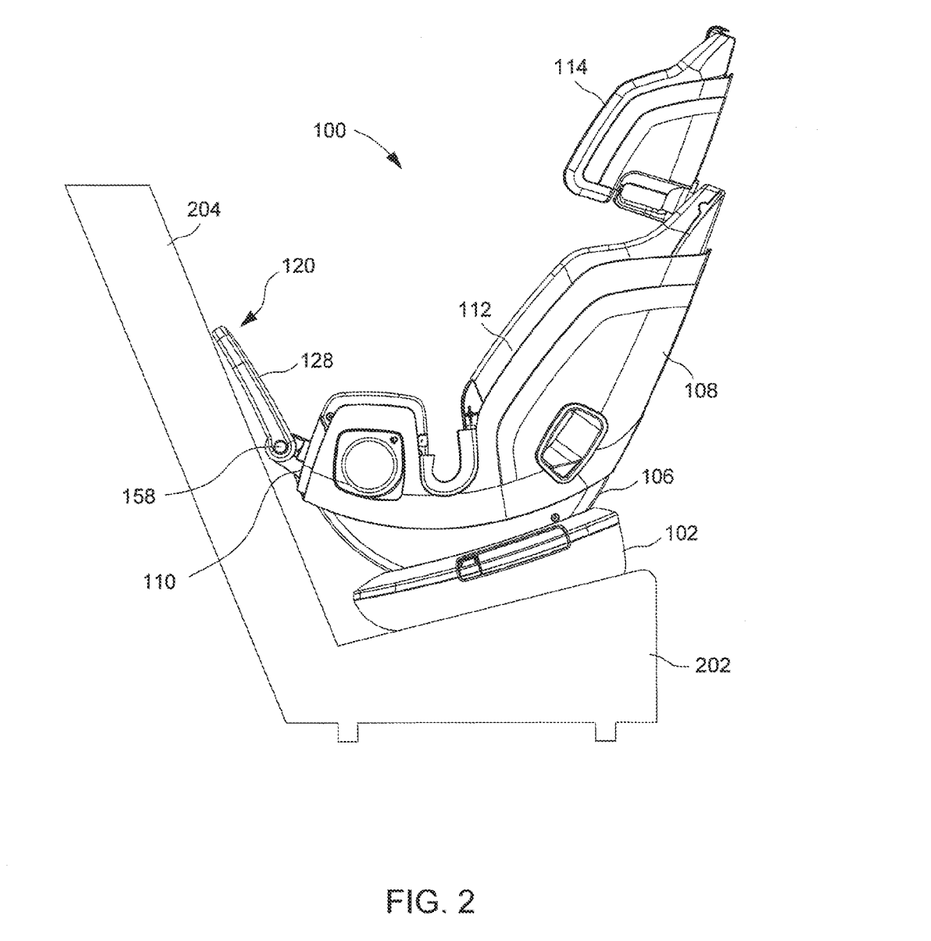
FIG. 2 is a side view illustrating the child safety seat installed on a vehicle seat in a rear facing position with an extension member of the child safety seat disposed in an anti-rebound configuration.

Referring to FIG. 1, the child safety seat 100 further includes an extension member 120 that is connected with the seat shell 106 and is disposed adjacent to the front end 110 of the seat shell 106. The extension member 120 may be adjusted to different configurations according to the needs. FIGS. 2-5 are side views illustrating exemplary configurations of use for the extension member 120. Referring to FIG. 2, the extension member 120 may be positioned in an anti-rebound configuration where the extension member 120 rises upward at the front end 110 of the seat shell 106. The extension member 120 can be positioned in the anti-rebound configuration when the child safety seat 100 is installed on a vehicle seat 202 in the rearward facing position, whereby the extension member 120 can abut against a seatback 204 of the vehicle seat 202 and prevent rebound of the child safety seat 100 when car collision occurs.

Figure 3:
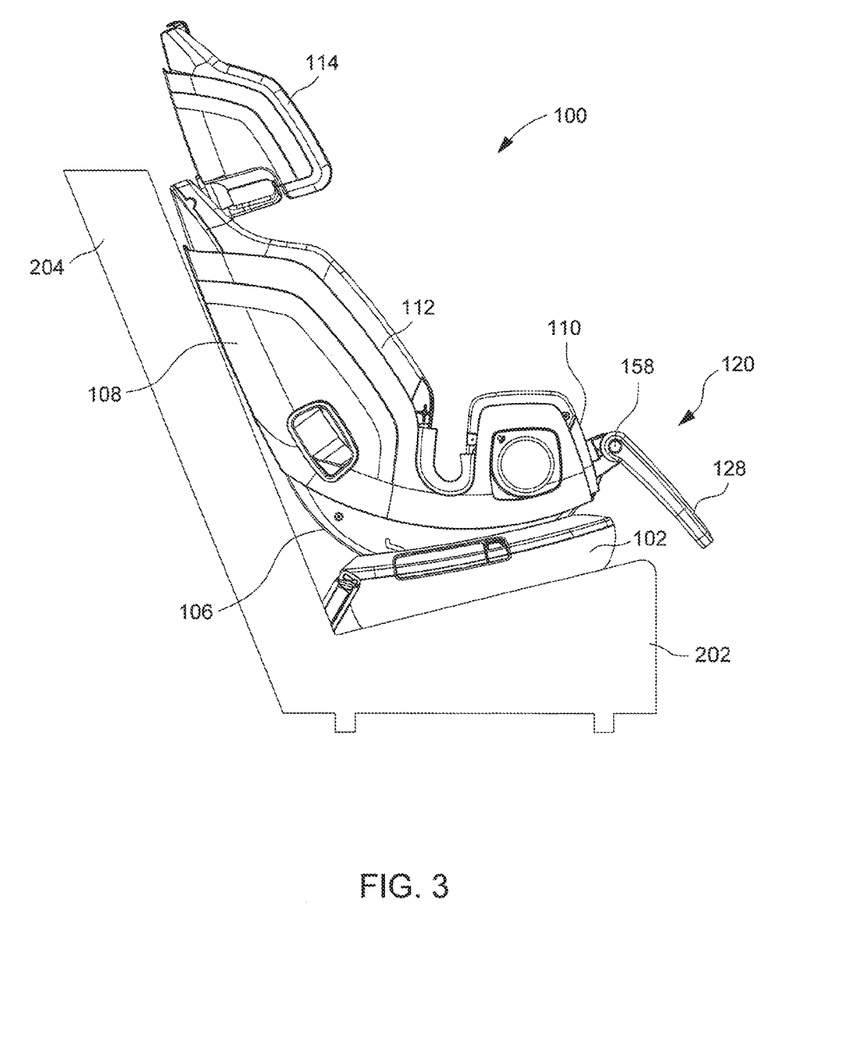
FIG. 3 is a side view illustrating the child safety seat installed on a vehicle seat in a forward facing position with the extension member of the child safety seat disposed in a leg support configuration.
Figure 4:
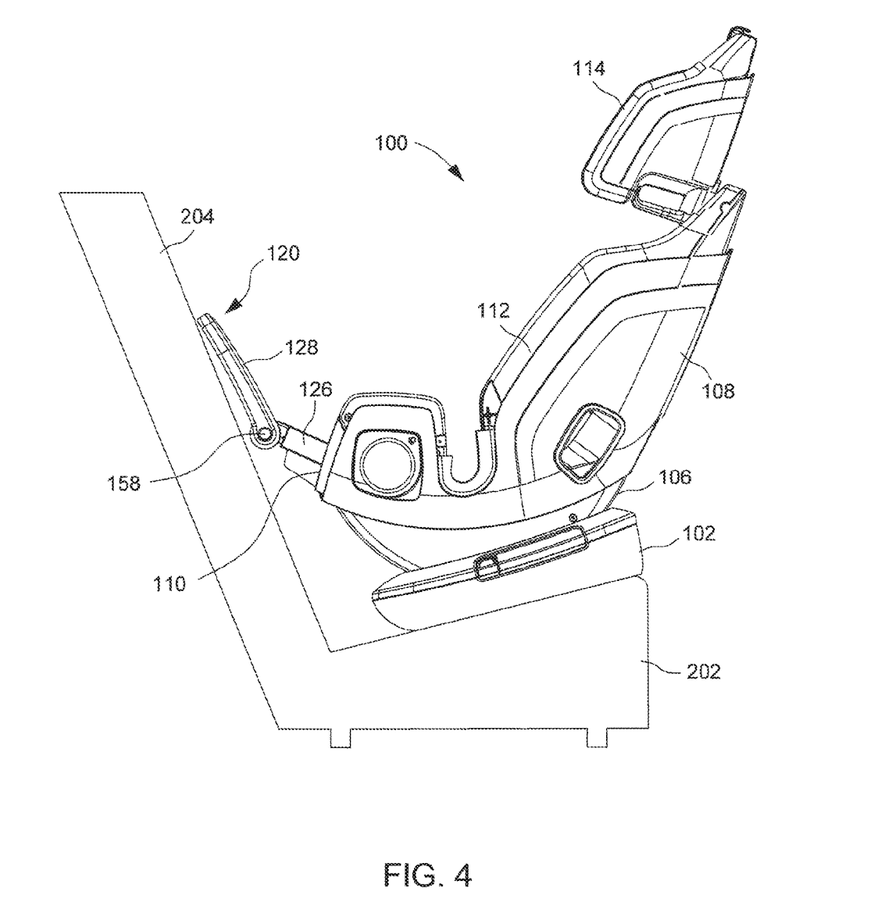
FIG. 4 is a side view illustrating the child safety seat installed on a vehicle seat in the rear facing position with the extension member of the child safety seat disposed in the anti-rebound configuration and stretching away from the front end of the seat shell for increasing a leg room.
Figure 5:
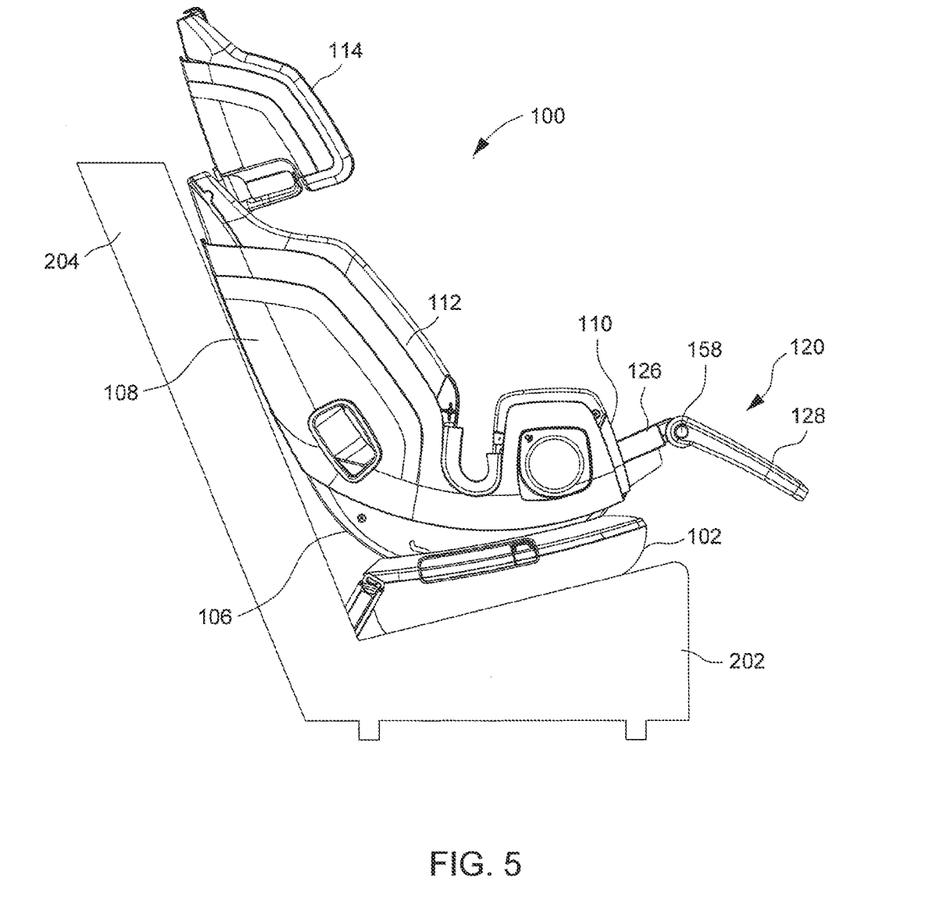
FIG. 5 is a side view illustrating the child safety seat installed on a vehicle seat in the forward facing position with the extension member of the child safety seat disposed in the leg support configuration and stretching away from the front end of the seat shell for increasing a leg room.

Referring to FIG. 3, the extension member 120 may be positioned in a leg support configuration in which the extension member 120 stretches forward and downward from the front end 110 of the seat shell 106. The extension member 120 can be positioned in the leg support configuration when the child safety seat 100 is installed on a vehicle seat 202 in the forward facing position, whereby the extension member 120 can provide resting support for the legs of a child received in the seat shell 106. It will be appreciated that different angular positions of the extension member 120 may be set in the leg support configuration to provide a comfortable support for the child's legs.

Referring to FIGS. 2 and 4 and FIGS. 3 and 5, in either of the anti-rebound configuration and the leg support configuration, the extension member 120 may further be retracted toward the seat shell 106 or extended forward so as to reduce or increase a leg room according to the size of a child received in the seat shell 106. For example, the extension member 120 is shown as being extended forward from the front end 110 in the anti-rebound configuration in FIG. 4, and extended forward from the front end 110 in the leg support configuration in FIG. 5.

Figure 6:
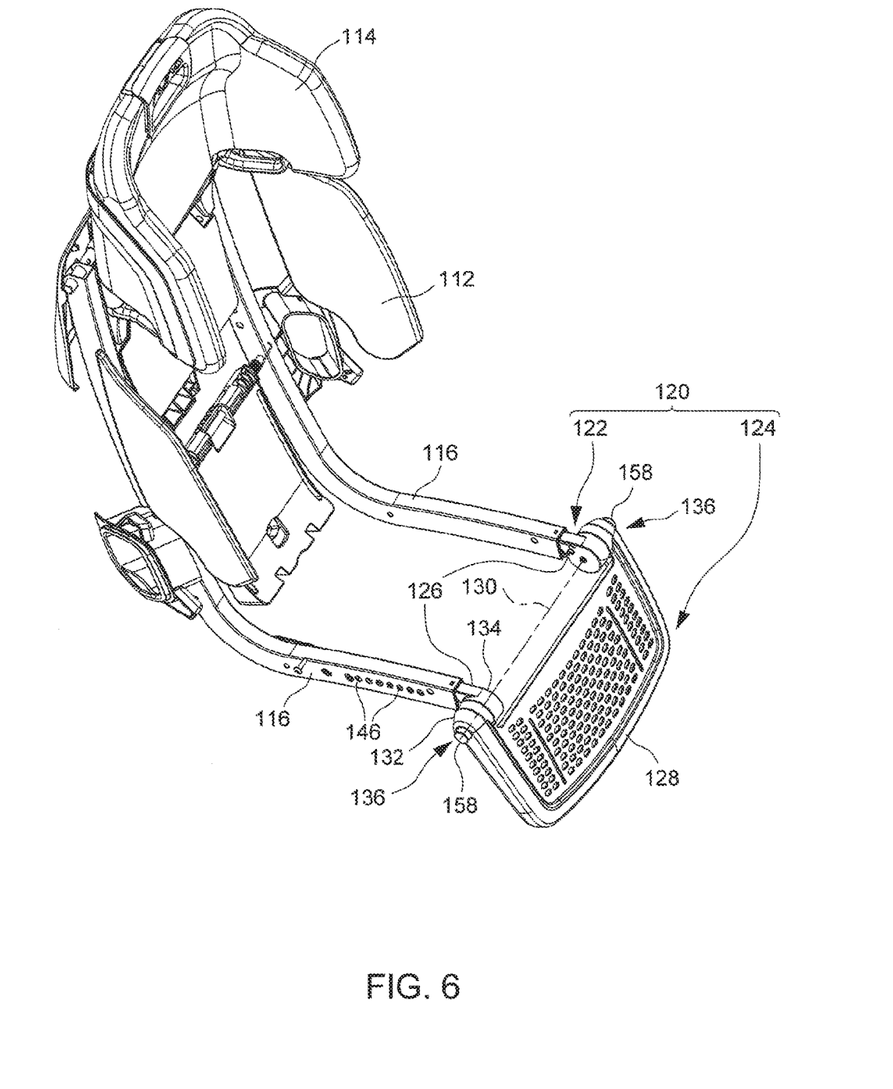
FIG. 6 is a schematic view illustrating the assembly of the extension member with the seat shell of the child safety seat.
Figure 7:
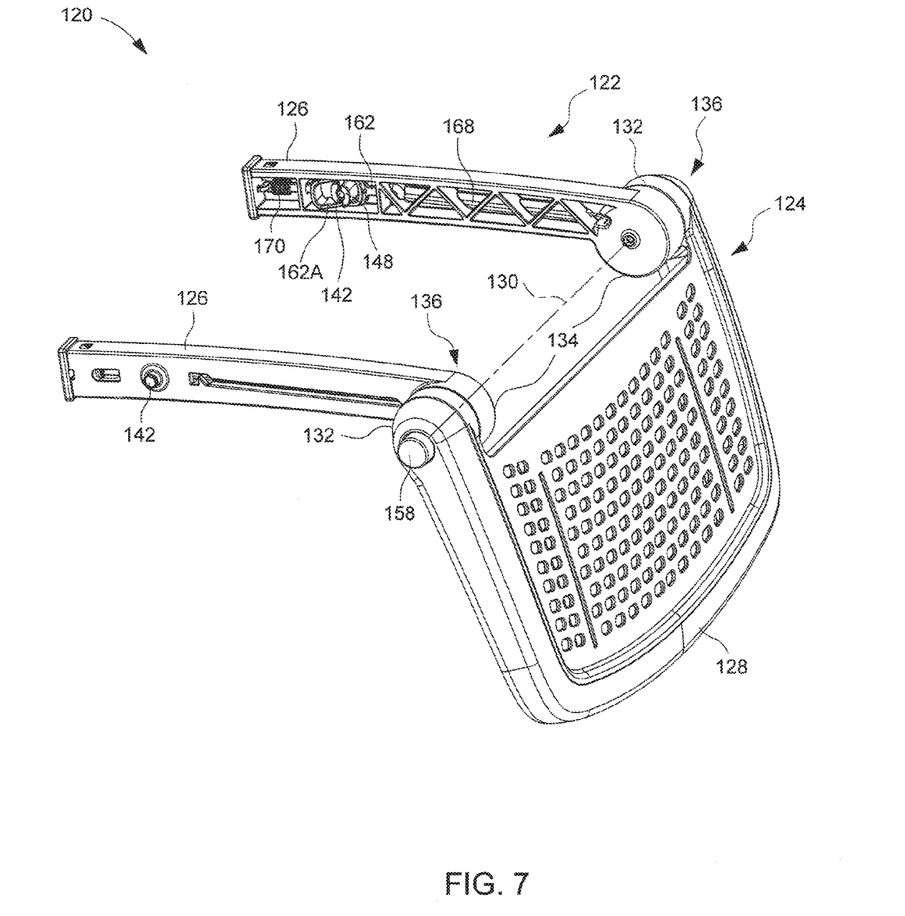
FIG. 7 is a perspective view illustrating the extension member alone.

In conjunction with FIGS. 1-5, FIG. 6 is a schematic view illustrating the assembly of the extension member 120 with the seat shell 106, and FIG. 7 is a perspective view illustrating the extension member 120 alone. For the sake of clarity, a portion of the seat shell 106 is omitted in FIG. 6 to better show the assembly of the extension member 120. Referring to FIGS. 1-7, the extension member 120 can include two adjustable parts 122 and 124 that are movably assembled with each other. The adjustable part 122 can be slidably connected with the seat shell 106, whereby the extension member 120 can slide relative to the seat shell 106 to extend forward from the front end 110 of the seat shell 106 or retract toward the seat shell 106 to increase or reduce a leg room for a child. According to an example of construction, the adjustable part 122 can include a plurality of support bars 126 (e.g., two support bars 126 are shown in the illustrated embodiment) that are respectively connected slidably with the rigid beams 116. For example, each support bar 126 may be telescopically assembled through one corresponding rigid beam 116.

According to an example of construction, the adjustable part 124 can include a panel 128. The adjustable part 124 can be pivotally connected with the adjustable part 122 about a pivot axis 130 that extends transversally from a left to a right side of the seat shell 106. For example, the panel 128 can be fixedly connected with two coupling portions 132, each support bar 126 can be respectively connected fixedly with a coupling portion 134, and the coupling portions 132 and 134 can be pivotally connected with each other about the pivot axis 130 to form a pivot joint 136 at each of the left and right sides of the extension member 120. Each coupling portion 132 can be formed integrally with the adjustable part 124, or can be a separate part fixedly attached to the adjustable part 124 via a fastener. Likewise, each coupling portion 134 can be formed integrally with the adjustable part 122, or can be a separate part fixedly attached to the adjustable part 122 via a fastener.

With the aforementioned construction, the adjustable part 122 can slide relative to the seat shell 106 to increase or reduce a distance between each pivot joint 136 and the front end 110 of the seat shell 106, thereby expanding or reducing a leg room in front of the seat shell 106. Moreover, the adjustable part 124 can rotate about the pivot axis 130 relative to the adjustable part 122 and the seat shell 106 in front of the front end 110 to set the anti-rebound configuration or the leg support configuration described previously. For example, the adjustable part 124 can rise upward from the pivot joints 136 in the anti-rebound configuration, and stretch forward and downward from the pivot joints 136 in the leg support configuration. It will be appreciated that different angular positions of the adjustable part 124 may be set in the anti-rebound configuration and the leg support configuration according to the needs. For example, rather than stretching forward and downward, the adjustable 124 may stretch substantially parallel to the adjustable part 122 in the leg support configuration so as to support the legs of a child.

In conjunction with FIGS. 1-7, FIG. 8 is an exploded view illustrating further construction details provided in the extension member 120. Referring to FIGS. 1-8, a latching mechanism 140 may be provided to lock the extension member 120 with respect to the seat shell 106 in any of the anti-rebound and leg support configurations. The latching mechanism 140 can include a latch 142 for locking the adjustable part 122 in position so as to prevent its sliding relative to the seat shell 106, and another latch 144 for rotationally locking the adjustable part 124 with respect to the adjustable part 122. Since the adjustable part 122 includes two support bars 126 in the illustrated embodiment, the same latching mechanism 140 comprised of the two latches 142 and 144 may be respectively provided at each of the left and right sides to lock and unlock the adjustable parts 122 and 124.

Figure 8:
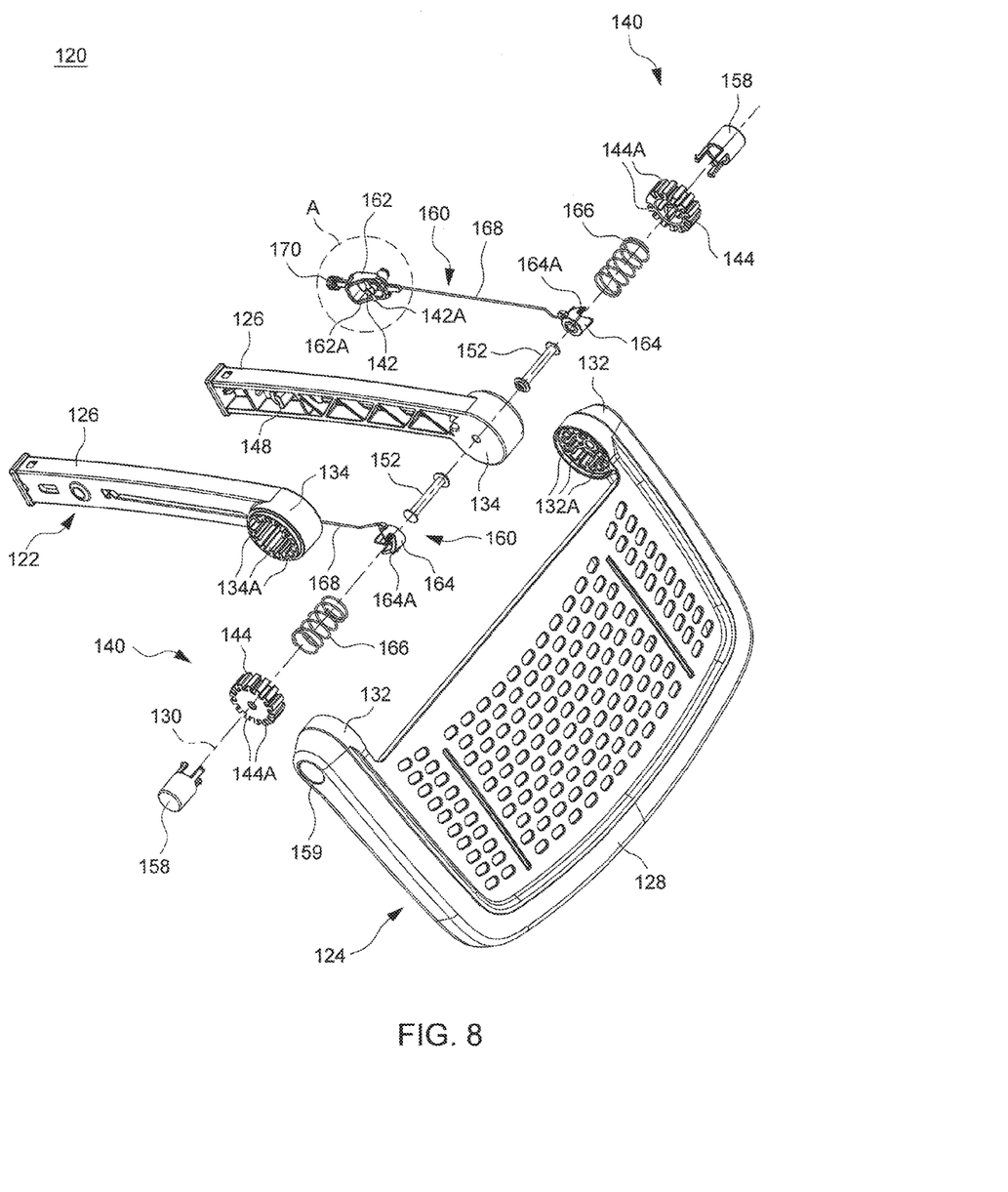
FIG. 8 is an exploded view illustrating the construction of a latch mechanism that is assembled with the extension member of the child safety seat.

According to an example of construction, the latch 142 can be slidably assembled with the adjustable part 122. The latch 142 can engage any one of multiple locking openings 146 (better shown in FIG. 6) provided in the seat shell 106 to lock the adjustable part 122 with respect to the seat shell 106, or disengage from the locking openings 146 to unlock the adjustable part 122 for its sliding adjustment relative to the seat shell 106. For example, the latch 142 can be slidably connected with one support bar 126, and the locking openings 146 can be provided along the corresponding rigid beam 116. The sliding assembly of the latch 142 can include, e.g., a guide slot 148 provided on the support bar 126, and a pin shape provided on the latch 142 and guided for sliding movement through the guide slot 148. The latch 142 can thereby slide transversally relative to the support bar 126 to engage or disengage any one of the locking openings 146 on the rigid beam 116, thereby locking or unlocking the support bar 126 with respect to the rigid beam 116.

Figure 9:
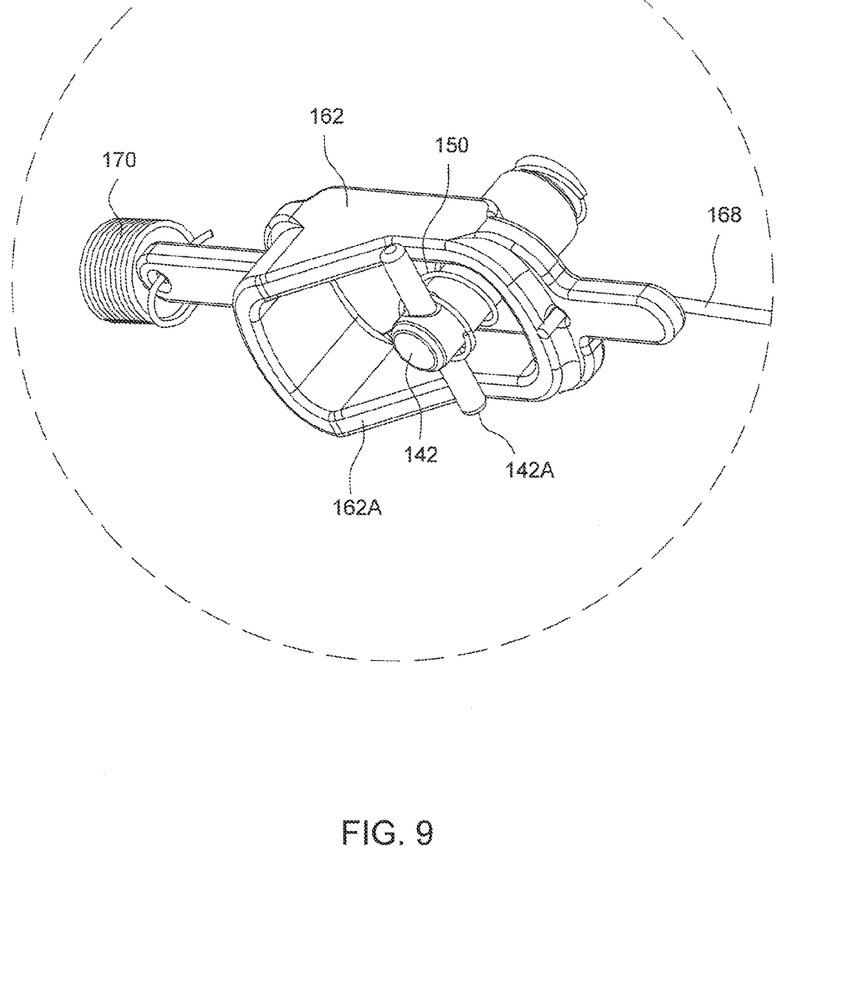
FIG. 9 is an enlarged view of portion A shown in FIG. 8.

Referring to FIGS. 8 and 9, the latching mechanism 140 at each of the left and right sides can further include a spring 150 having two ends respectively connected with the latch 142 and the support bar 126. The spring 150 can bias the latch 142 for engagement with the seat shell 106 to lock the adjustable part 122 with respect to the seat shell 106.

Referring to FIG. 8, the latch 144 for rotationally locking the adjustable part 124 can be assembled with the extension member 120 and received in an inner cavity defined between the two coupling portions 132 and 134 of the pivot joint 136. According to an example of construction, the latch 144 may be assembled for sliding movement along the pivot axis 130 defined by the pivot joint 136. For example, the pivot axis 130 may be defined by a shaft 152 that pivotally connects the two coupling portions 132 and 134, and the latch 144 can be assembled for sliding movement along the shaft 152. The latch 144 can thereby move along the pivot axis 130 between a locking position where the latch 144 is engaged with the two coupling portions 132 and 134 to prevent rotation of the adjustable part 124 relative to the adjustable part 122, and an unlocking position where the latch 144 is disengaged from one of the two coupling portions 132 and 134 for rotation of the adjustable part 124 relative to the adjustable part 122. For example, the latch 144 may be circumferentially provided with a plurality of teeth 144A, and each of the coupling portions 132 and 134 can include a plurality of corresponding grooves (grooves 132A for the coupling portion 132, and grooves 134A for the coupling portion 134). The teeth 144A of the latch 144 can be engaged with the grooves 132A of the coupling portion 132 and the grooves 134A of the coupling portion 134 in the locking position, and can disengage from the grooves 132A of the coupling portion 132 in the unlocking position.

It will be appreciated that instead of having the teeth 144A of the latch 144 disengaged from the grooves 132A of the coupling portion 132 in the unlocking position, an alternative embodiment may have the teeth 144A of the latch 144 disengaged from the grooves 134A of the coupling portion 134 in the unlocking position.

Referring to FIG. 8, the latching mechanism 140 provided at each of the left and right sides can further include a spring 166 having two ends respectively connected with the latch 144 and the coupling portion 134. The spring 166 can bias the latch 144 to the locking position for engagement with the two coupling portions 132 and 134.

Referring to FIGS. 7 and 8, the latching mechanism 140 provided at each of the left and right sides can further include a release actuator 158. The release actuator 158 is assembled with the extension member 120 and is operatively connected with the two latches 142 and 144, whereby the release actuator 158 is operable to cause the two latches 142 and 144 to move concurrently for unlocking the two adjustable parts 122 and 124. According to an embodiment, the release actuator 158 can be slidably assembled adjacent to the pivot joint 136, e.g., the coupling portion 132 can include an opening 159, and the release actuator 158 may be assembled in the opening 159 for sliding movement along the pivot axis 130. When the release actuator 158 is depressed, the release actuator 158 can contact with the latch 144 and urge the latch 144 to move against the biasing force of the spring 166 from the locking position to the unlocking position for unlocking the adjustable part 124.

Referring to FIG. 8, the latching mechanism 140 further includes a linking assembly 160 for operatively connecting the release actuator 158 with the latch 142, which is disposed remotely from the release actuator 158. The linking assembly 160 can movably link the two latches 142 and 144 so that an operation of the release actuator 158 can cause the two latches 142 and 144 to move concurrently for unlocking the two adjustable parts 122 and 124. According to an example of construction, the linking assembly 160 can include two actuating parts 162 and 164, a wire 168 and a spring 170. The actuating part 162 is movably assembled with the adjustable part 122 adjacent to the latch 142, and can be in sliding contact with the latch 142. For example, the actuating part 162 can be assembled for sliding movement along the support bar 126 perpendicularly to the sliding axis of the latch 142. As better shown in FIG. 9, the actuating part 162 can have a ramp 162A in sliding contact with a lateral protrusion 142A provided on the latch 142. Owing to this sliding contact, a forward displacement of the actuating part 162 can urge the latch 142 to slide for unlocking the adjustable part 122.

The actuating part 164 can be movably assembled between the two coupling portions 132 and 134 of the pivot joint 136, and can be disposed adjacent to the latch 144. For example, the actuating part 164 can be pivotally assembled about the shaft 152 so that the actuating part 164 can rotate about the same pivot axis 130 of the adjustable part 124. During a sliding displacement of the latch 144 for unlocking the adjustable part 124, the actuating part 164 can be urged by the latch 144 to rotate relative to the latch 144 and the coupling portions 132 and 134 via a sliding contact between the latch 144 and the actuating part 164. For example, the latch 144 can be in sliding contact with a ramp 164A provided on the actuating part 164 while sliding for unlocking the adjustable part 124.

The wire 168 can have two opposite ends respectively connected with the two actuating parts 162 and 164. Accordingly, a movement of the latch 144 for unlocking the adjustable part 124 can cause the actuating part 164 to rotate and pull the actuating part 162 to slide forward, which in turn can urge the latch 142 to slide for unlocking the adjustable part 122 via the sliding contact between the latch 142 and the ramp 162A of the actuating part 162.

The spring 170 is operable to apply a biasing force that can assist in displacing the two actuating parts 162 and 164 to an initial state as the latches 142 and 144 recover their respective locking positions. For example, the spring 170 can have two opposite ends respectively connected with the adjustable part 122 (e.g., the support bar 126) and the actuating part 162. The biasing force applied by the spring 170 can tend to pull the actuating part 162 rearward away from the pivot joint 136.

Exemplary operation of the latching mechanism 140 is described hereinafter with reference to FIGS. 7-9. When the release actuator 158 is depressed, the release actuator 158 can push the latch 144 to slide against the biasing force of the spring 166 from the locking position to the unlocking position for unlocking the adjustable part 124 as described previously. As the latch 144 moves toward the unlocking position, the latch 144 can urge the actuating part 164 to rotate in a first direction via the sliding contact between the latch 144 and the ramp 164A of the actuating part 164, which in turn can pull the actuating part 162 to slide forward against the biasing force of the spring 170. As a result, the actuating part 162 can urge the latch 142 to slide against the biasing force of the spring 150 for disengaging from the locking openings 146 and unlocking the adjustable part 122. Accordingly, the release actuator 158 is operable to cause concurrent unlocking of the two latches 142 and 144 for adjustment of the extension member 120 to a desirable configuration.

When the caregiver releases the release actuator 158, the latch 144 is urged by the spring 166 and move from the unlocking position to the locking position for rotationally locking the adjustable part 124 with respect to the adjustable part 122. As the latch 144 moves to the locking position, the latch 144 can disengage from the actuating part 164. As a result, the spring 170 can pull the actuating part 162 rearward, which can facilitate a sliding displacement of the latch 142 biased by the spring 150 for locking the adjustable part 122 with respect to the seat shell 106. As the actuating part 162 moves rearward, the actuating part 162 can pull the actuating part 164 via the wire 168 so that the actuating part 164 can rotate in a second direction opposite to the first direction and recover its initial state. Accordingly, the two latches 142 and 144 can move concurrently to lock the extension member 120 in position.

Advantages of the child safety seat described herein include an extension member that is more flexible in use and is adjustable to different configurations according to the needs. The extension member may be disposed in an anti-rebound configuration when the child safety seat is installed in a rear facing position, and in a leg support configuration when the child safety seat is installed in a forward facing position. Moreover, the extension member may be further adjustable to increase or reduce a front leg room so that the child safety seat can advantageously accommodate children of different ages.

Realization of the child safety seat has been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A child safety seat comprising:
   a seat shell for receiving a child, the seat shell having a backrest and a front end opposite to the backrest;
   an extension member connected with the seat shell, the extension member being positionable in a first configuration where the extension member rises upward at the front end of the seat shell, and in a second configuration where the extension member stretches forward and downward from the front end of the seat shell, wherein the extension member includes a first adjustable part slidably connected with the seat shell, and a second adjustable part pivotally connected with the first adjustable part about a pivot joint, the first adjustable part being slidable relative to the seat shell to increase or reduce a distance between the pivot joint and the front end of the seat shell, the second adjustable part rising upward from the pivot joint in the first configuration and stretching forward and downward from the pivot joint in the second configuration; and
   a latching mechanism operable to lock the extension member with respect to the seat shell in any of the first and second configurations.

2. The child safety seat according to claim 1, wherein the first adjustable part includes a support bar, and the second adjustable part includes a panel.

3. The child safety seat according to claim 1, wherein the latching mechanism includes a first and a second latch, the first latch being operable to lock the first adjustable part in position so as to prevent sliding of the first adjustable part relative to the seat shell, and the second latch being operable to rotationally lock the second adjustable part with respect to the first adjustable part.

4. The child safety seat according to claim 3, wherein the first latch is assembled with the first adjustable part and is movable to engage and disengage the seat shell, the first adjustable part being locked in position when the first latch engages the seat shell, and the first adjustable part being unlocked for sliding adjustment relative to the seat shell when the first latch is disengaged from the seat shell.

5. The child safety seat according to claim 4, wherein the seat shell includes a plurality of locking openings, and the first latch engages with any of the locking openings to lock the first adjustable part with the seat shell.

6. The child safety seat according to claim 4, wherein the latching mechanism further includes a first spring operable to urge the first latch for engagement with the seat shell.

7. The child safety seat according to claim 3, wherein the pivot joint includes a first coupling portion fixedly connected with the first adjustable part and a second coupling portion fixedly connected with the second adjustable part, the first and second coupling portions being pivotally connected with each other about a pivot axis, and the second latch being movable along the pivot axis between a locking and an unlocking position, the second latch being engaged with the first and second coupling portions in the locking position to prevent rotation of the second adjustable part, and the second latch being disengaged from one of the first and second coupling portions in the unlocking position for rotation of the second adjustable part.

8. The child safety seat according to claim 7, wherein the latching mechanism further includes a second spring connected with the second latch, the second spring being operable to bias the second latch toward the locking position.

9. The child safety seat according to claim 7, wherein the latching mechanism further includes a release actuator connected with the second latch, the release actuator being operable to urge the second latch to move from the locking position to the unlocking position for unlocking the second adjustable part.

10. The child safety seat according to claim 9, wherein the latching mechanism further includes a linking assembly operable to movably link the first latch and the second latch so that an operation of the release actuator causes the first and second latches to move concurrently for unlocking the first and second adjustable parts.

11. The child safety seat according to claim 10, wherein the linking assembly includes a first actuating part movably assembled with the first adjustable part and in sliding contact with the first latch, a second actuating part disposed adjacent to the second latch and movably assembled between the first and second coupling portions, and a wire respectively connected with the first and second actuating parts, an operation of the release actuator for unlocking the second adjustable part causing the second latch to urge the second actuating part to move so that the second actuating part pulls the first actuating part in movement for urging the first latch to unlock the first adjustable part.

12. The child safety seat according to claim 11, wherein the first actuating part is slidably assembled with the first adjustable part, and the second actuating part is pivotally assembled between the first and second coupling portions, an operation of the release actuator for unlocking the second adjustable part causing the release actuator to push the second latch to move in sliding contact with the second actuating part, the second actuating part being thereby urged to rotate in a first direction and pull the first actuating part in movement for causing a displacement of the first latch that unlocks the first adjustable part.

13. The child safety seat according to claim 12, wherein the linking assembly further includes a third spring respectively connected with the first actuating part and the first adjustable part, the third spring being operable to bias the first actuating part to move and pull the second actuating part to rotate in a second direction opposite to the first direction.

14. A child safety seat comprising:
a seat shell for receiving a child, the seat shell having a backrest and a front end opposite to the backrest;
an extension member disposed adjacent to the front end of the seat shell and including a first and a second adjustable part, the first adjustable part being slidably connected with the seat shell, the second adjustable part being pivotally connected with the first adjustable part about a pivot joint, the first adjustable part being slidable relative to the seat shell to increase or reduce a distance between the pivot joint and the front end of the seat shell, and the second adjustable part being rotatable relative to the first adjustable part and the seat shell in front of the front end;
a first and a second latch respectively assembled with the extension member, the first latch being movable to lock and unlock the first adjustable part with respect to the seat shell, and the second latch being operable to rotationally lock and unlock the second adjustable part with respect to the first adjustable part; and
a release actuator assembled with the extension member and operatively connected with the first and second latches, the release actuator being operable to cause the first and second latches to move concurrently for unlocking the first and second adjustable parts.

15. The child safety seat according to claim 14, wherein the first and second latches are movably linked to each other via a linking assembly that includes a first actuating part disposed adjacent to the first latch, a second actuating part disposed adjacent to the second latch, and a wire respectively connected with the first and second actuating parts, an operation of the release actuator causing the second latch to urge the second actuating part to move so that the second actuating part pulls the first actuating part in movement for urging the first latch to unlock the first adjustable part.

16. The child safety seat according to claim 15, wherein the pivot joint includes a first and a second coupling portion pivotally connected with each other and respectively connected fixedly with the first and second adjustable part, the first actuating part is slidably assembled with the first adjustable part, and the second latch and the second actuating part are received between the first and second coupling portions with the second actuating part being pivotally assembled adjacent to the second latch, an operation of the release actuator for unlocking the second adjustable part causing the release actuator to push the second latch to move in sliding contact with the second actuating part, the second actuating part being thereby urged to rotate and pull the first actuating part in movement for causing a displacement of the first latch that unlocks the first adjustable part.

17. The child safety seat according to claim 16, further including a first spring, a second spring and a third spring, the first spring being operable to urge the first latch for engagement with the seat shell, the second spring being operable to bias the second latch to a locking position that rotationally locks the second adjustable part with respect to the first adjustable part, and the third spring being operable to bias the first actuating part to move and pull the second actuating part in rotation as the second latch moves to the locking position.

18. The child safety seat according to claim 14, wherein the first adjustable part includes a support bar, and the second adjustable part includes a panel.

19. The child safety seat according to claim 14, wherein the pivot joint includes a first and a second coupling portion pivotally connected with each other and respectively connected fixedly with the first and second adjustable part, the first latch is slidably assembled with the first adjustable part and the second latch is received between the first and second coupling portions, the first latch being movable to engage and disengage the seat shell for locking and unlocking the first adjustable part, the second latch being movable between a locking position where the second latch is engaged with the first and second coupling portions and an unlocking position where the second latch is disengaged from one of the first and second coupling portions.

20. The child safety seat according to claim 14, wherein the seat shell is fixedly connected with a rigid beam extending from the backrest toward the front end of the seat shell, and the first adjustable part is slidably connected with the rigid beam.

21. The child safety seat according to claim 14, wherein the second adjustable part is positionable in a first configuration where the second adjustable part rises upward from the pivot joint, and in a second configuration where the second adjustable part stretches forward and downward from the pivot joint.

* * * * *